United States Patent [19]

Wise

[11] 4,173,333
[45] Nov. 6, 1979

[54] VARIABLE DESIGN TORCH GUIDE

[76] Inventor: Dennis Wise, Star Route, Mesa, Wash. 99343

[21] Appl. No.: 950,304

[22] Filed: Oct. 11, 1978

[51] Int. Cl.² .......................... B23K 7/00; B23K 7/02
[52] U.S. Cl. ........................................ 266/66; 266/72
[58] Field of Search ................................. 266/66, 72

[56] References Cited

U.S. PATENT DOCUMENTS

| | | | |
|---|---|---|---|
| 2,036,734 | 4/1936 | Kehl | 266/66 |
| 2,040,062 | 5/1936 | Ost et al. | 266/66 |
| 2,281,814 | 5/1942 | Willoughby | 266/66 |
| 2,483,294 | 9/1949 | Miner | 266/66 |
| 3,170,015 | 2/1965 | Ziebart | 266/66 |
| 3,514,087 | 5/1970 | Richards | 266/66 |

Primary Examiner—W. Stallard
Attorney, Agent, or Firm—Charles L. Kraft, II

[57] ABSTRACT

The torch guide comprises a main bar, a pair of work rests dependently mounted on bars which are in turn mounted to the main bar, and a pair of torch clamps which are each dependently mounted on pivots to the main bar. The guide may operate on both flat, and curve work such as pipe.

5 Claims, 3 Drawing Figures

VARIABLE DESIGN TORCH GUIDE

FIELD OF THE INVENTION

The present invention relates to torch cutting devices, and more particularly to accessories therefore which are operate to cut beveled edge.

BRIEF DESCRIPTION OF THE PRIOR ART

Means commonly you should have employed to produce a beveled edge in metal cut work, have typically been restricted to tables or jigs, and to reamers and grinders not related to dimension cutting step. Tables lack portability and small numbers of cuts. Reamers may be highly inacurate and are always to be considered to be a surplus operation.

Accordingly, it is an object of the present invention to provide a variable degree torch guide for hand-held operation.

It is a further object to provide the aforesaid guide be particularly adapted to bevel cutting.

These and other objects shall become apparent from the description following, it being understood that modifications may be made without affecting the teachings of the invention here set out.

SUMMARY OF INVENTION

The torch guide comprises a main bar, a pair of work rests dependently mounted on bars which are in turn mounted to the main bar, and a pair of torch clamps which are each dependently mounted on pivots to the main bar. The guide may operate on both flat, and curve work such as pipe. The guide may be adjusted for both arc and degree of bevel.

A more thorough and comprehensive understanding may be had from the detailed description of the preferred embodiment when read in connection with the drawings forming a part of this specification.

DETAILED DESCRIPTION OF THE PREFERRED EMBODIMENT

Figure 1:
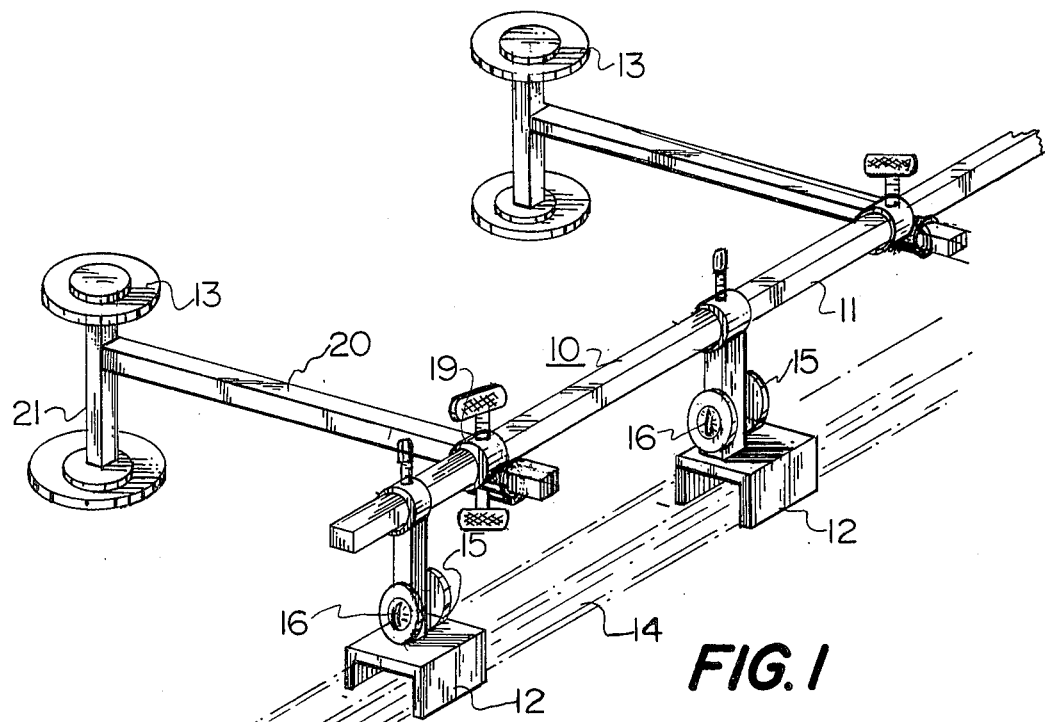
FIG. 1 is a perspective view of the variable degree torch guide of this invention shown with a torch drawn in broken lines for illustrative purposes.

Referring now to the drawings and more particularly to the FIG. 1, the variable degree torch guide of this invention is shown to advantage and generally identified by the numeral 10. The guide 10 comprises a longitudinal rod 11, a pair of torch clamps 12, and a pair of rests 13.

The rod 11 is intended to slideably carry the clamps 12 and arms 13. The rod 11 is mounted in parallel and superimposed fashion to the tube portion of a torch 14, by means of the clamps 12. Each of the clamps 12 may be of any of a variety of types such a substancially U-shaped compression clamp. Each clamp 12 is mounted on a pivot 15 secured by a screw 16 similar locking means. The clamp 12 is mounted to the pivot 15 by a stem 17. The sleeve 16 slide along the rod 11, and is secured by a locking screw 18.

Figure 2:
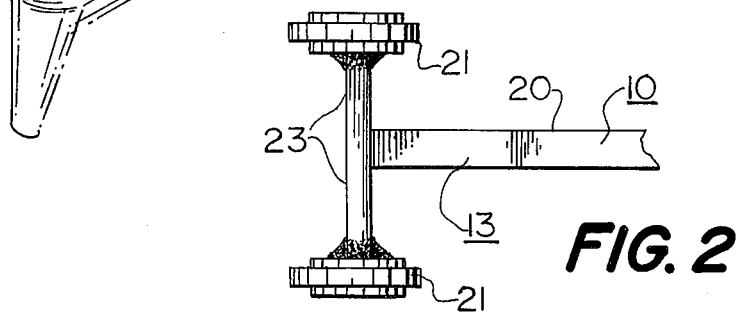
FIG. 2 is a side elevation view of the present guide.

The rests 13 provide reference and support as the guide 10 is drawn over the work. As shown in the FIG. 2, each rest 13 comprises a sleeve 19 which slideably engages the rod 11, and arm 20 which slideably engages the sleeve 19, and rest pad 21. As above, the sleeve 19 secures the rod 11 and arm 20 by means of lock screws 22 and $22^1$, respectively.

Figure 3:
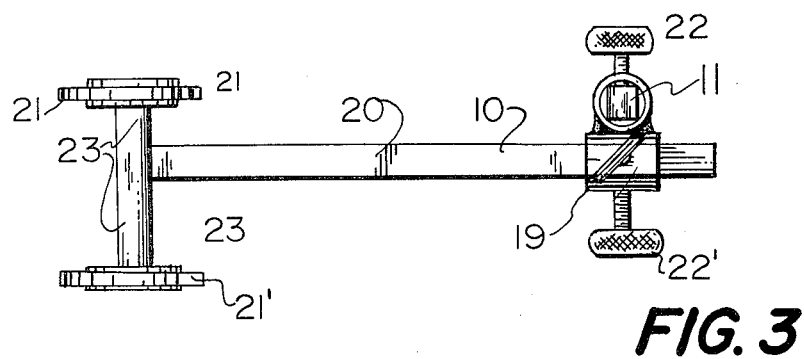
FIG. 3 is a fragmentary side elevation view of a typical rest thereof.

Referring to the FIG. 3, the pad 21 issues from one of the terminal ends of the arm 20 on stem 23 which is a flat surface disposed parallely to the rectilinear axis of the arm 20. The pad 21 has a flat circular configuration which reliably passes over the surface of the work. It has been found to advantage dimension the stem 23 to carry the torch 14 at operating height with the arms 20 disposed substancially parallely to the work. It has also been found to provide a pair of pads 21 issuing an opposing stems 23 of differing lengths to more conbeniently compensate for working height.

In operation, the guide 10, fitted with a torch 14, is adjusted at the arms 20 to pass conveniently over the work. The clamps 12 are pivoted and locked at the desired angle. The guide 10 is then operated in the manner of conventional cutting torches.

Having thus described in detail a preferred apparatus which embodies the concepts and principles of the invention and which accomplishes the various objects, purposes and aims thereof, it is to be appreciated and will be apparent to those skilled in the art that many physical changes could be made in the apparatus without altering the inventive concepts and principles embodied therein. Hence, it is intended that the scope of the invention be limited only to the extent indicated in the appended claims.

I claim:

1. A variable degree guide for a gas cutting torch, comprising:
 a main bar;
 a pair of arms, each slideably secured in a sleeve which is slideably secured on said main bar; and
 means for securing said torch to said guide wherein the longitudinal axis of said torch is in registry with said main bar.

2. The apparatus of claim 1 wherein said means for securing said torch to said guide is a compression clamp slideably mounted to said main bar.

3. The apparatus of claim 1 wherein one end of each of said arms includes a pad which has a circular, disclike configuration, having its flat surface dispose parallely to said arm.

4. The apparatus of claim 3 wherein a pair of said pads issue from opposing stems, perpendicularly from said end of each arm.

5. The apparatus of claim 1 said means securing said torch to said guide includes means for adjustably pivoting said torch.

* * * * *